United States Patent
Kim

(10) Patent No.: US 7,599,684 B2
(45) Date of Patent: Oct. 6, 2009

(54) AUTOMATIC SETTING METHOD FOR TERMINAL INFORMATION USING SUBSCRIBER IDENTITY MODULE

(75) Inventor: Kwang-Nam Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 1239 days.

(21) Appl. No.: 10/245,327

(22) Filed: Sep. 18, 2002

(65) Prior Publication Data

US 2003/0186723 A1    Oct. 2, 2003

(30) Foreign Application Priority Data

Mar. 27, 2002  (KR) ............................ 2002-0016798

(51) Int. Cl.
*H04M 3/00*    (2006.01)
(52) U.S. Cl. ................. 455/418; 455/550.1; 455/556.1; 455/557; 455/558; 455/567; 455/90.1; 713/2; 713/100
(58) Field of Classification Search ....... 455/41.1–41.2, 455/550.1, 556.1–556.2, 557–558, 418–420, 455/88, 575.1, 8, 90.1–90.3, 575.8, 564–567; 713/1–2, 100; 235/472.01–472.02
See application file for complete search history.

(56) References Cited

U.S. PATENT DOCUMENTS

| | | | |
|---|---|---|---|
| 5,633,484 A | 5/1997 | Zancho et al. | |
| 5,895,903 A * | 4/1999 | Abe et al. | 235/380 |
| 6,014,568 A * | 1/2000 | Alperovich et al. | 455/456.3 |
| 6,314,285 B1 | 11/2001 | Isberg et al. | |
| 2001/0001875 A1* | 5/2001 | Hirsch | 713/1 |
| 2002/0019248 A1* | 2/2002 | Ruck | 455/566 |
| 2002/0030103 A1* | 3/2002 | Wycherley et al. | 235/439 |
| 2002/0039909 A1* | 4/2002 | Rankin | 455/558 |

FOREIGN PATENT DOCUMENTS

WO    WO 01/93612 A1    12/2001

OTHER PUBLICATIONS

"Digital cellular telecommunications system (Phase 2+); Specification of the Subscriber Identity Module—Mobile Equipment (SIM-ME) Interface (3Gpp TS 11.11 version 8.60 Release 1999)", *Global System for Mobile Communications*—ETSI Standards, European Telecommunications Standards Institute, Sophia-Antipolis, France; Dec. 2001, cover p. and pp. 15, 53, 54, 116 and 117.
European Office Action dated Nov. 26, 2005.
European Search Report (3 pages), Feb. 2003.

* cited by examiner

*Primary Examiner*—Tuan A Tran
(74) *Attorney, Agent, or Firm*—KED & Associates, LLP

(57) ABSTRACT

A method and apparatus for setting terminal information using a Subscriber Identity Module (SIM) include inserting a SIM into a terminal and automatically setting terminal information stored in the SIM. In accordance with preferred embodiments of the present invention, there is no need for a terminal user to set the terminal information again when the terminal user uses different terminals to operate the current terminal according to the terminal information, which was used in the previous terminal and set in the SIM, when operations of the current terminal require the same, such as when the current terminal displays data. Thus, the terminal information that was previously used can be directly set using the SIM.

35 Claims, 3 Drawing Sheets

AUTOMATIC SETTING METHOD FOR TERMINAL INFORMATION USING SUBSCRIBER IDENTITY MODULE

BACKGROUND OF THE INVENTION

1. Field of the Invention

The present invention relates to a terminal apparatus and a method for setting terminal information, and in particular, to a method and apparatus for setting terminal information using a Subscriber Identity Module (SIM).

2. Background of the Related Art

The Subscriber Identity Module (SIM) is a type of a smart card for performing data processing process for a mobile phone service on the basis of security functions such as password, authentication and the like, and providing mobility of individuals. When a terminal user inserts a SIM, which contains terminal information often used by the user, to a terminal even if the terminal is not his or her own one, the terminal information stored in the SIM can be set in the current terminal. Therefore, when the terminal user uses a different terminal, the terminal information is set using the inserted SIM, in which terminal information formerly used by the user is stored, and displayed.

One embodiment of the operation that the terminal user manually performs to set the terminal information using a phone book in accordance with the related art will now be described with reference to FIG. 1. As shown in FIG. 1, after starting, the terminal user opens the phone book of the terminal (step S10). Then, the user searches for a menu for setting the terminal information (step S11). When the setting menu of the terminal information is searched, the terminal sets the searched terminal information (step S12). As each portion of the terminal information is set, the terminal checks whether additional terminal information to be set next exists (step S13).

As the result of checking (step S13), if the additional terminal information to be set next exists, the terminal can repeatedly search for the setting menu of such additional terminal information and can perform a corresponding predetermined process. Thus, from step S13 the process jumps back to step S10. However, if the additional terminal information to be set next does not exist, the terminal closes the phone book and ends the setting process of the terminal information.

The process for setting terminal information where the terminal information is a language, a background screen and a bell sound (i.e., ring) in accordance with the related art will now be described with reference to FIG. 1. First, the terminal user opens the phone book of the terminal and searches for the language setting menu. The terminal user selects the language to be used in the searched menu and then closes the phone book. The terminal user then reopens the phone book to set the background screen, which is the next terminal information in order after closing the phone book. The terminal user searches for the background setting menu after reopening the phone book and selects a desired background screen from the searched background screen setting menu.

The terminal user who selected the background screen closes the phone book and then again reopens the phone book to set the bell sound, which is the next terminal information in order. When the bell sound setting menu is searched by reopening the phone book, the terminal user selects the desired bell sound from the searched bell sound setting menu and closes the phone book. After closing the phone book, the user has completed the terminal information setting of the terminal because there is no terminal information to be set next.

As described above, however, the related art process for setting terminal information using SIM has various disadvantages. In the related art, the terminal user must repeatedly set the terminal information when transferring the SIM containing user profile information to a different terminal. Thus, when the terminal user uses the terminal, there occurs an inconvenience that the terminal user must manually set the combination of terminal information again after searching the corresponding menus in order by repeating opening the phone book to use the terminal information that was previously used.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a setting method for terminal information using a Subscriber Identity Module (SIM) with which there is no need to set the terminal information again whenever the terminal user uses different terminals.

Another object of the present invention is to provide a direct setting method for terminal information using a SIM with which there is no need to set the terminal information by displaying the terminal information again whenever the terminal user uses different terminals because the terminal information that was previously used is directly set using the SIM.

To achieve at least the above objects and other advantages in a whole or in part and in accordance with the purpose of the present invention, as embodied and broadly described herein, there is provided a method for setting terminal information that includes providing a Subscriber Identity Module (SIM) with prescribed user information stored therein, accessing the prescribed user information in the SIM, and setting terminal information stored in the SIM.

To further achieve at least the above objects and other advantages in a whole or in part and in accordance with the purpose of the present invention, as embodied and broadly described herein, there is provided a method for setting GSM handset terminal information that includes providing a Subscriber Identity Module (SIM) with prescribed user information stored therein, inserting the SIM into a terminal, accessing the prescribed user information in the SIM, directly setting terminal information according to the user information stored in the SIM, and operating the terminal using the terminal information set in the terminal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2A:
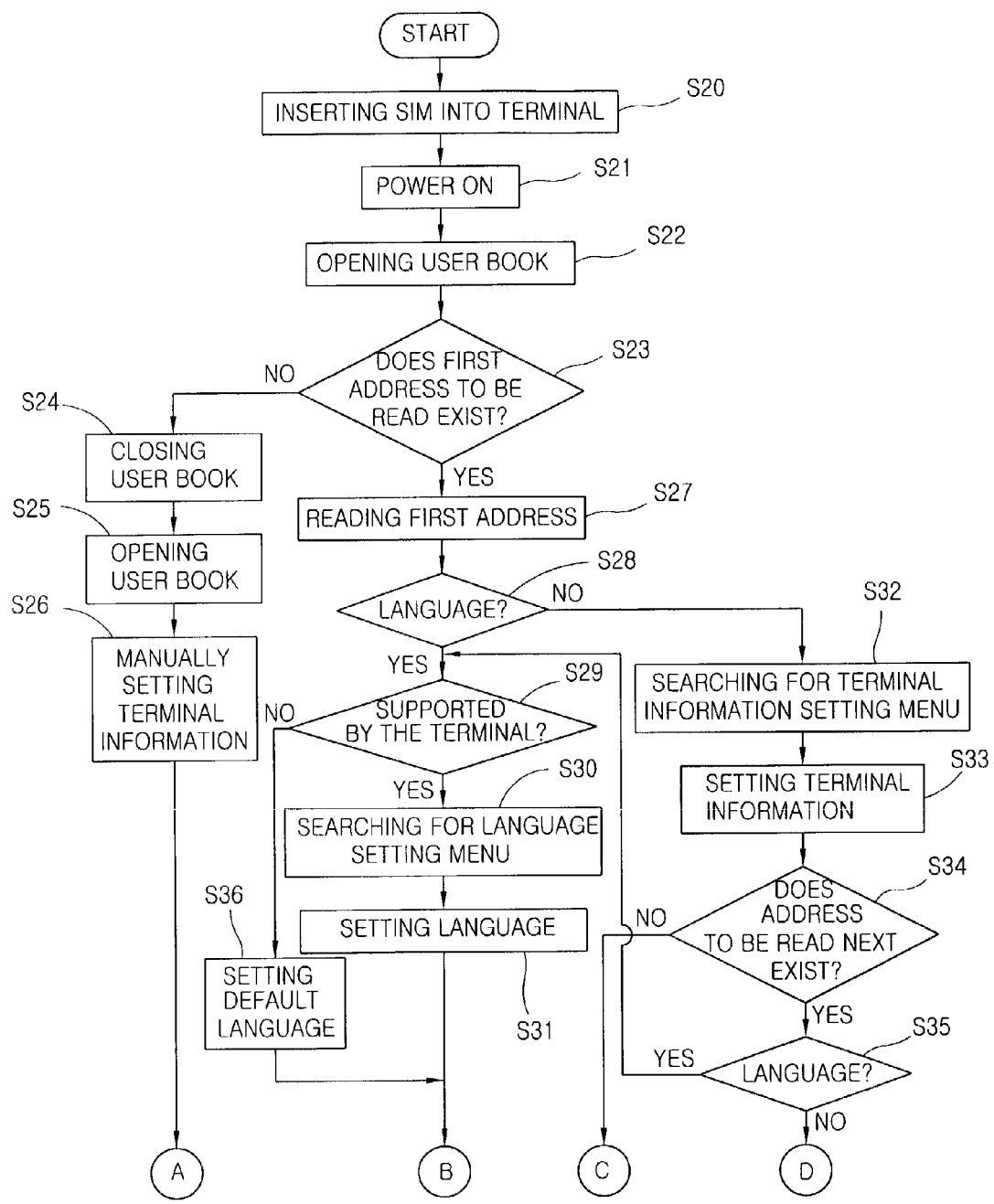
FIG. 2 is a flow chart illustrating a preferred embodiment of setting process for terminal information using a Subscriber Identity Module (SIM) in accordance with the present invention.
Figure 2B:
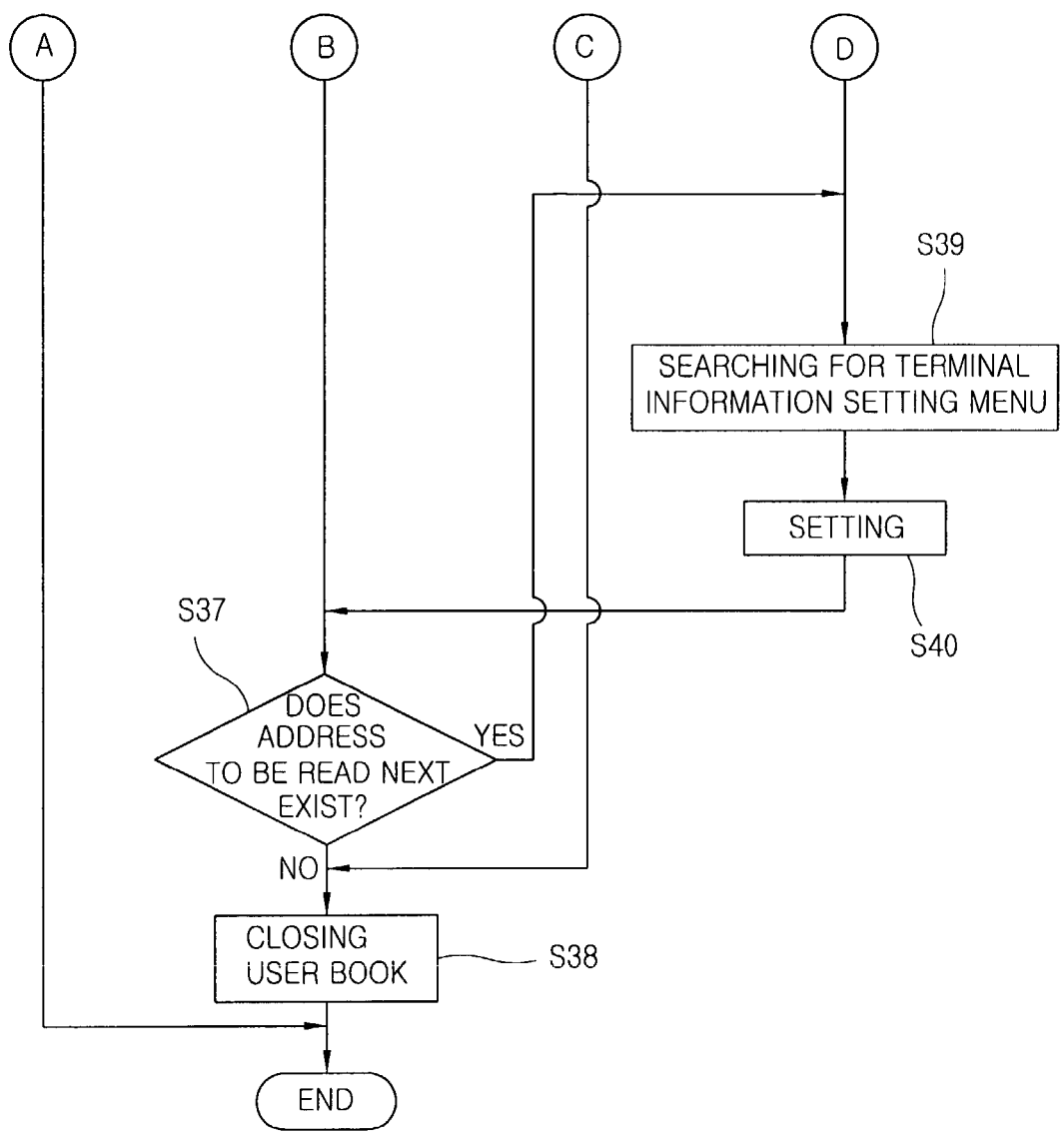

FIG. 2 is a flow chart illustrating a preferred embodiment of a process for initializing terminal information by inserting a Subscriber Identity Module (SIM). As shown in FIG. 2, the SIM preferably stores information of the previous terminal.

After a process starts as shown in FIG. 2, the terminal user inserts the SIM containing terminal information, which is preferably often used by the user, into the terminal to be used (step S20). The terminal user who inserts the SIM into the terminal turns on the power of the terminal (step S21). The terminal opens the user book, which exists in the electrically erasable and programmable read only memory (EEPROM) of the SIM, upon its initialization (step S22) and then checks whether data to be read exists (step S23).

Figure 1:
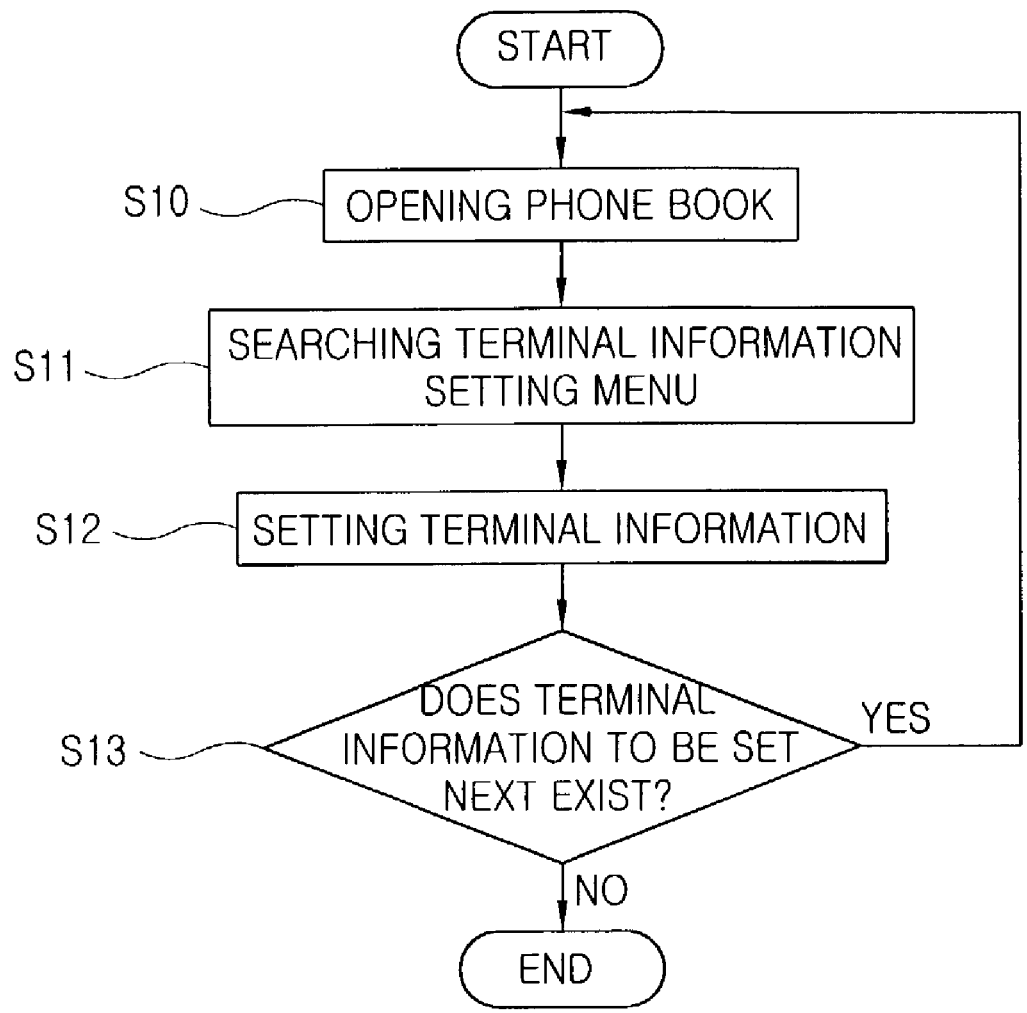
FIG. 1 is a flow chart illustrating a manual setting process for terminal information in accordance with the related art.

As the result of checking (step S23), if a first address to be read does not exist, the terminal user closes the user book in the terminal and preferably sets the terminal information manually by opening the phone book (steps S24-S26). For example, the manual setting of the terminal information can be implemented as described above with respect to FIG. 1, and accordingly, a detailed description is omitted.

However, if the first address to be read exists (step S23), the terminal reads the first address of the data stored in the user book (step S27). The terminal checks whether the data stored in the firstly read address is language (step S28). If the data is the language as the result of the checking (step S28), then the terminal checks whether the language is a language that is supported by the terminal (step S29). As the result of the checking (step S29), if the language is not supported by the terminal, the terminal preferably sets a default language that is supported by the terminal (step S36). However, as the result of the checking (step S29), if the language stored in the data is supported by the terminal, the terminal searches the language setting menu (step S30). When the language setting menu is searched, the terminal sets the language (step S31). The terminal having set the language (e.g., default or selected) checks whether a next address to be read exists (step S37).

As the result of checking (step S37), if the next address to be read does not exist, the terminal preferably closes the user book and ends a process for the terminal information setting (step S38). However, if the next address to be read exists as a result of the checking (step S37), the terminal reads the address and then searches for the corresponding information setting menu (step S39). After setting the corresponding information menu (step S40), the terminal can repeat the predetermined setting process by jumping back to check whether the next address to be read exists (step S37).

However, if it is determined that a different kind of terminal information, which is not the language, is stored in the first address of the read data (step S28), the terminal searches for the corresponding information setting menu (step S32). The terminal preferably uses the searched corresponding information setting menu to set the information (step S33) and can repeat the predetermined process described above (steps S34-S35 and S37-40). For example, a check to determine if the next address to be read exists is preferably performed (step S34).

When the next address exists (step S34), a check to determine if the data stored in the next address is language (step S35) is performed.

The process for setting the terminal information, that is, the language, background screen and the bell sound previously used and stored in the SIM in accordance with preferred embodiments of the present invention will now be described with reference to FIG. 2.

The terminal user inserts the SIM in which the information of the previous terminal is stored, into the terminal and then turns on the power for the terminal. The terminal whose power was turned on preferably reads the language stored in address 1 of the data that is stored in the EEPROM of the SIM.

The language is stored in the address 1 of the data, which is stored in the SIM as the terminal information, the background screen is stored in the address 2, and the bell sound is stored in the address 3. Also, it is assumed that the language stored in the address 1 is supported or provided by the terminal.

The terminal user inserts the SIM in which the language, background screen and bell sound are stored into the terminal to be used. After inserting the SIM into the terminal, the power of the terminal is turned on. The power of the terminal is turned on and at the same time, the terminal directly or automatically starts the terminal information initializing process by reading the SIM. The terminal preferably opens the user book that exists in the EEPROM of the SIM and checks whether the information stored such as in the address 1 of the data to be read exists.

Since it is determined that the information to be read, that is, the language exists as the result of checking, the terminal reads the language stored in the address 1 of the data. The terminal then preferably checks whether the language stored in the address 1 that was read is a language supported by the terminal.

As the result of checking, since it is determined that the language is supported by the terminal, the terminal automatically sets the language stored in the address 1. After automatically setting the language, the terminal checks whether the address to be read next exists. As the result of the checking, since the background screen data that is in the address 2 exists, the terminal searches for a menu for setting the background screen data. After searching the setting menu for the background screen, the terminal automatically sets the background screen and then checks whether the address 3, which will preferably be read next, exists. As the result of checking, since the bell sound data that is in the address 3 exists, the terminal searches for the setting menu of the bell sound. After searching the setting menu of the bell sound, the terminal automatically sets the bell sound and then checks whether there exists an address to be read next. As the result of checking, since the address that would be read next does not exist, the terminal closes the user book and ends the terminal information setting. Thus, each terminal to be used can be directly set up for a user.

As described above, the SIM was inserted into the terminal before the terminal was enabled. However, the present invention is not intended to be so limited. For example, a current terminal could be enabled and then have the SIM installed and preferred embodiments according to the present invention could preferably detect the SIM, directly access the relevant terminal information (e.g., previous terminal language) and update operations of the current terminal. As described above, the previously stored information had a prescribed order, however, the present invention is not intended to be so limited. Further, such a prescribed order may be varied. As described above, the terminal information is stored as data in prescribed addresses, however, the present invention is not intended to be so limited. For example, the corresponding address could indirectly access the data.

As described above, preferred embodiments of a method and apparatus for setting terminal information have various advantages. The preferred embodiments for a setting method for terminal information using the SIM in accordance with the present invention can prevent or reduce the inconvenience of the related art where the terminal user must manually set the previously used terminal information stored in the SIM whenever the terminal user uses different terminals. Further, preferred embodiments allow inserting the SIM in which the terminal information was previously used into a current terminal to be used and directly setting the terminal information.

The foregoing embodiments and advantages are merely exemplary and ate not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for setting terminal information, comprising:
providing a Subscriber identity Module (SIM) with prescribed user information stored therein;
inserting the SIM into a terminal;
accessing the prescribed user information in the SIM; and
automatically setting terminal information stored in the SIM in response to power of the terminal being turned on, wherein the terminal information includes a language supported by the terminal, and wherein automatically setting the terminal information includes automatically setting the language of the terminal before automatically setting any other terminal information of the terminal based on the prescribed user information provided in the SIM.

2. The method of claim 1, wherein the setting terminal information is performed without a user action after the power of the terminal is turned on.

3. The method of claim 1, wherein the setting terminal information is automatically performed using a user book of the SIM.

4. The method of claim 1, wherein the SIM stores the terminal information of a previously used terminal.

5. The method of claim 1, wherein the terminal information is initially set manually by a user without using the SIM.

6. The method of claim 1, wherein the terminal information further includes at least one of a background screen and a bell sound that are used in the terminal.

7. The method of claim 1, wherein a set of languages are supported by the terminal, and wherein a default language from the set is selected when a designated language is not in the set of languages supported by the terminal.

8. The method of claim 1, wherein the user information from the SIM is directly stored as the terminal information, and wherein the user information is the terminal information of a previously used terminal.

9. The method of claim 1, wherein the terminal information is stored in the form of data in an electrically erasable and programmable read only memory (EEPROM) of the SIM.

10. The method of claim 9, wherein each terminal information is respectively stored in an address of the data that is stored in the EEPROM of the SIM.

11. The method of claim 1, wherein the terminal is a GSM capable portable telephone handset.

12. The method of claim 1, wherein providing the SIM with the prescribed user information includes:
setting the prescribed user information of a user in another terminal accessing the SIM prior to inserting the SIM into the terminal; and
removing the SIM from the another terminal such that the SIM is provided with the prescribed user information.

13. A method for setting terminal information, comprising:
providing a Subscriber Identity Module (SIM) with prescribed user information stored therein;
inserting the SIM into a terminal;
turning on power of the terminal;
automatically accessing the prescribed user information in the SIM upon turning on the power of the terminal;
directly setting terminal information according to the user information stored in the SIM upon turning on the power of the terminal, wherein the terminal information includes a language supported by the terminal, and wherein the directly setting the terminal information includes determining whether a language provided in the SIM is supported by the terminal and setting a default language of the terminal when the language provided in the SIM is determined to not be supported by the terminal, and wherein the directly setting the terminal information includes directly setting the language of the terminal before directly setting any other terminal information of the terminal based on the prescribed user information provided in the SIM; and
operating the terminal using the terminal information set in the terminal.

14. The method of claim 13, wherein the directly setting terminal information is performed without a user action after turning on the power of the terminal.

15. The method of claim 13, wherein the directly setting terminal information is automatically performed after turning on the power of the terminal using a user book of the SIM.

16. The method of claim 13, wherein the terminal information further includes at least one of a background screen and a bell sound that are used in the terminal.

17. The method of claim 13, wherein the SIM directly stores the terminal information of a previously used terminal.

18. The method of claim 13, wherein the providing the SIM with the prescribed user information comprises:
setting the prescribed user information of a first user in a first terminal accessing the SIM; and
removing the SIM from the first terminal such that the SIM is provided with the prescribed user information.

19. A method for setting terminal information, comprising:
providing a Subscriber Identity Module (SIM) with prescribed user information stored therein;
inserting the SIM into a terminal;
accessing the prescribed user information in the SIM; and
automatically setting terminal information stored in the SIM including setting a default language of the terminal when a language provided in the SIM is not supported by the terminal, wherein the automatically setting the terminal information includes automatically setting the language of the terminal based on the prescribed user information provided in the SIM, and wherein the automatically setting the language of the terminal occurs before automatically setting any other terminal information of the terminal.

20. The method of claim 19, wherein the SIM is provided with terminal information of a previously-used terminal.

21. A method for setting terminal information comprising:
storing user information in a Subscriber Identity Module (SIM) while the SIM is provided in a first terminal and such that the stored user information relates to terminal information of the first terminal;
inserting the SIM into a second terminal; and
in response to turning on the power of the second terminal, automatically accessing and setting terminal information in the second terminal based on the stored user information in the SIM, wherein the terminal information includes a language, and wherein the automatically accessing and setting the terminal information includes setting a default language of the second terminal when a language stored in the SIM is not supported by the second terminal, and wherein the automatically accessing and setting the terminal information further includes automatically accessing and setting the language of the second terminal before automatically accessing and setting any other terminal information of the second terminal.

22. A method for setting terminal information, comprising:
accessing a prescribed user information in a Subscriber Identity Module (SIM) when the SIM is inserted into a terminal;
determining whether or not user preference setting information exists by sequentially reading memory address;
checking whether or not the user preference setting information is supported by the terminal;
wherein the terminal automatically sets the terminal information including the user preference setting information stored in the SIM when the SIM is inserted into the terminal; and
setting the terminal according to a default user preference setting information if the user preference information is not supported by the terminal.

23. The method of claim 22, wherein if a first address to be read does not exist, the terminal user sets the terminal information manually without using the SIM.

24. The method of claim 22, wherein the SIM stores the terminal information of a previously used terminal.

25. The method of claim 22, wherein the terminal information is initially set manually by a user without using the SIM.

26. The method of claim 22, wherein the terminal information includes at least one of a language, a background screen and a bell sound that are used in the terminal.

27. The method of claim 26, wherein a set of languages are supported by the terminal, and a default language from the set is selected when a designated language is not in the set of languages supported by the terminal.

28. The method of claim 22, wherein the user information from the SIM is directly stored as the terminal information, and the user information is the terminal information of a previously used terminal.

29. The method of claim 22, wherein the terminal information is stored in the form of data in an electrically erasable and programmable read only memory (EEPROM) of the SIM.

30. The method of claim 29, wherein each terminal information is respectively stored in an address of the data that is stored in the EEPROM of the SIM.

31. The method of one of the claims 22 to 30, wherein the method is used for setting GSM handset terminal information and the terminal is a GSM capable telephone handset.

32. The method of claim 22, wherein the terminal is operated using the terminal information set in the terminal.

33. The method of claim 22, wherein the SIM directly stores the terminal information of a previously used terminal.

34. The method of claim 33, wherein the SIM with the prescribed user information is provided, and the providing the SIM with the prescribed user information comprises:
initially setting the prescribed user information of a first user in a first terminal accessing the SIM; and
removing the SIM from the first terminal.

35. The method of claim 22, wherein the user preference setting information comprises at least one of a language, a background screen and a bell sound that are used in the terminal.

* * * * *